(12) United States Patent
Dunkmann et al.

(10) Patent No.: US 9,656,537 B2
(45) Date of Patent: May 23, 2017

(54) BENT WINDOWPANE

(75) Inventors: Benno Dunkmann, Eupen (BE);
Jean-Marie Le Ny, Gemmenich (BE);
Michael Balduin, Alsdorf (DE)

(73) Assignee: SAINT GOBAIN GLASS FRANCE, Courbevoie (FR)

( * ) Notice: Subject to any disclaimer, the term of this patent is extended or adjusted under 35 U.S.C. 154(b) by 572 days.

(21) Appl. No.: 13/990,391

(22) PCT Filed: Dec. 12, 2011

(86) PCT No.: PCT/EP2011/072492
§ 371 (c)(1),
(2), (4) Date: Aug. 8, 2013

(87) PCT Pub. No.: WO2012/080194
PCT Pub. Date: Jun. 21, 2012

(65) Prior Publication Data
US 2014/0011000 A1  Jan. 9, 2014

(30) Foreign Application Priority Data
Dec. 13, 2010  (EP) .................................. 10194800

(51) Int. Cl.
B60J 1/00  (2006.01)
C03B 23/025  (2006.01)
(Continued)

(52) U.S. Cl.
CPC .......... B60J 1/008 (2013.01); C03B 23/0252 (2013.01); C03B 23/0258 (2013.01);
(Continued)

(58) Field of Classification Search
CPC ..... B60J 1/008; B60J 1/02; Y10T 428/24628; C03B 23/0357
See application file for complete search history.

(56) References Cited

U.S. PATENT DOCUMENTS 3,114,571 A * 12/1963 Leflet, Jr. .................. B60J 1/02
296/84.1
5,285,660 A  2/1994 Petitcollin et al.
(Continued)

FOREIGN PATENT DOCUMENTS

CN  1130600 A  9/1996
CN  101888927 A  11/2010
(Continued)

OTHER PUBLICATIONS

WO2010136702_English Translation, Dec. 2, 2010.*
(Continued)

Primary Examiner — Aaron Austin
Assistant Examiner — Jasper Saberi
(74) Attorney, Agent, or Firm — Steinfl + Bruno LLP

(57) ABSTRACT

A vehicle glazing is described. The vehicle glazing has at least one windowpane having a height from 900 mm to 1650 mm, a top upper edge, a side edge of a pillar, a body edge, and two rectangular surfaces A and B. The surface A has an extent of 800 mm*800 mm and the surface B has an extent of 1000 mm*700 mm. Surface A and surface B are centrally bounded by the lowest contact point of the at least one windowpane with the body edge horizontally with respect to the ground, and the lowest contact point and the point of the top upper edge at the shortest distance from the contact point form a Y0 axis and the points at the furthest distance with respect to the width of the windowpane form a Z0 axis.

16 Claims, 7 Drawing Sheets

Figure 1:
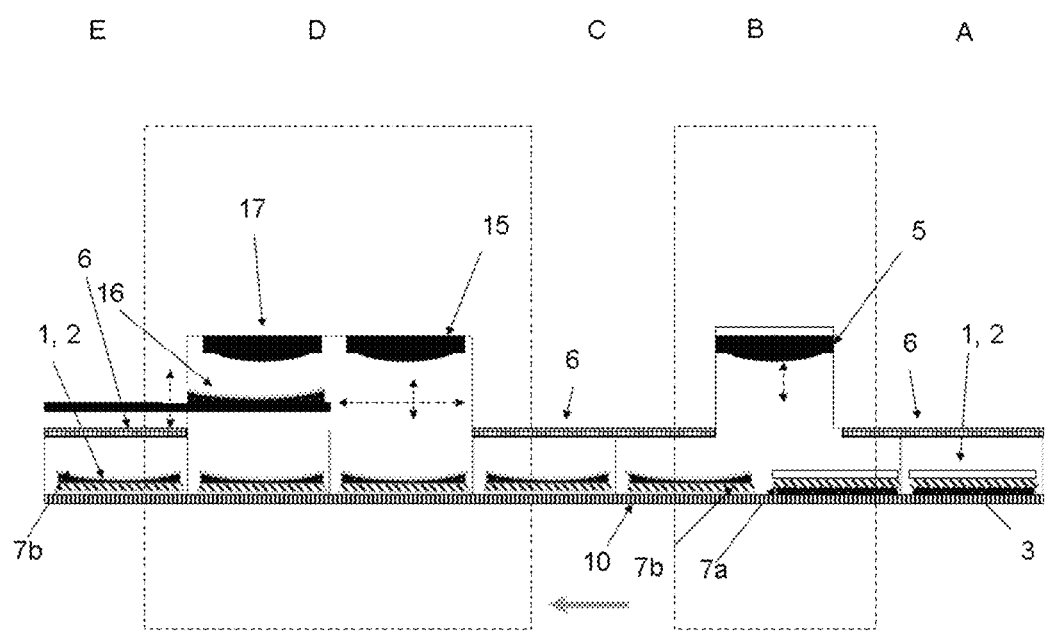

(51) Int. Cl.
  *C03B 23/03* (2006.01)
  *C03B 23/035* (2006.01)
  *C03B 35/20* (2006.01)
  *B60J 1/02* (2006.01)

(52) U.S. Cl.
  CPC .......... *C03B 23/03* (2013.01); *C03B 23/0357* (2013.01); *C03B 35/202* (2013.01); *B60J 1/02* (2013.01); *Y10T 428/24628* (2015.01)

(56) References Cited

U.S. PATENT DOCUMENTS

| | | | |
|---|---|---|---|
| 5,660,609 | A | 8/1997 | Muller et al. |
| 5,713,976 | A | 2/1998 | Kuster et al. |
| 6,076,373 | A | 6/2000 | Grodziski |
| 6,138,477 | A | 10/2000 | Morin |
| 6,749,926 | B1 * | 6/2004 | Yoshizawa ............... B60J 1/008 428/174 |
| 7,231,787 | B2 | 6/2007 | Neuman et al. |
| 7,302,813 | B2 | 12/2007 | Balduin et al. |
| 8,146,387 | B2 | 4/2012 | Ollfisch et al. |
| 8,327,667 | B2 | 12/2012 | Balduin et al. |
| 8,978,418 | B2 | 3/2015 | Balduin et al. |
| 2002/0117250 | A1 * | 8/2002 | Veerasamy ....... B32B 17/10036 156/101 |
| 2005/0142332 | A1 | 6/2005 | Sauer |
| 2007/0157671 | A1 | 7/2007 | Thellier et al. |
| 2008/0134721 | A1 | 6/2008 | Maeda |
| 2008/0134722 | A1 | 6/2008 | Balduin et al. |
| 2008/0190143 | A1 | 8/2008 | Balduin et al. |
| 2009/0277440 | A1 | 11/2009 | Angel et al. |
| 2010/0236290 | A1 | 9/2010 | Fukami et al. |
| 2010/0257900 | A1 | 10/2010 | Yajima et al. |
| 2010/0314900 | A1 | 12/2010 | Labrot et al. |
| 2012/0070624 | A1 * | 3/2012 | Payen ............... B32B 17/10036 428/172 |
| 2014/0011000 | A1 | 1/2014 | Dunkmann et al. |

FOREIGN PATENT DOCUMENTS

| | | |
|---|---|---|
| DE | 4337559 | 3/1995 |
| DE | 10314266 | 6/2004 |
| DE | 102005001513 | 6/2006 |
| DE | 102007059323 | 6/2009 |
| EP | 0677491 | 10/1995 |
| EP | 1358131 | 11/2003 |
| EP | 1371616 | 12/2003 |
| EP | 2233444 | 9/2010 |
| WO | 02064519 | 8/2002 |
| WO | 2010/074548 | 7/2010 |
| WO | 2010136702 | 12/2010 |
| WO | 2012080071 | 6/2012 |
| WO | 2012080072 | 6/2012 |

OTHER PUBLICATIONS

Non-Final Office Action for U.S. Appl. No. 13/990,399, filed Aug. 9, 2013 in the name of Michael Balduin. Mail date: May 1, 2014.
Notice of Allowance for U.S. Appl. No. 13/990,399, filed Aug. 9, 2013 in the name of Michael Balduin. Mail date: Nov. 7, 2014.
Restriction Requirement for U.S. Appl. No. 14/015,850, filed Aug. 30, 2013 in the name of Michael Balduin. Mail date: Feb. 28, 2014.
Non-Final Office Action for U.S. Appl. No. 14/015,850, filed Aug. 30, 2013 in the name of Michael Balduin. Mail date: Apr. 18, 2014.
Final Office Action for U.S. Appl. No. 14/015,850, filed Aug. 30, 2013 in the name of Michael Balduin. Mail date: Oct. 23, 2014.
Restriction Requirement for U.S. Appl. No. 13/990,409, filed Aug. 7, 2013 in the name of Michael Balduin et al.. Mail date: Jul. 6, 2015.
Restriction Requirement for U.S. Appl. No. 13/990,409, filed Aug. 7, 2013 in the name of Michael Balduin et al.. Mail date: Jul. 23, 2015.
Non-Final Office Action for U.S. Appl. No. 13/990,409, filed Aug. 7, 2013 in the name of Michael Balduin et al.. Mail date: Oct. 2, 2015.
Non-Final Office Action for U.S. Appl. No. 14/015,850, filed Aug. 30, 2013 in the name of Michael Balduin et al.. Mail date: Oct. 21, 2015.
PCT Written Opinion mailed on Feb. 27, 2012 for PCT Application PCT/EP2011/072492 filed on Dec. 12, 2011 in the name of Saint-Gobain Glass France (English + German Version).
PCT Written Opinion mailed on Feb. 27, 2012 for PCT Application PCT/EP2011/072169 filed on Dec. 8, 2011 in the name of Saint-Gobain Glass France (English + German Version).
PCT Written Opinion mailed on Mar. 6, 2012 for PCT Application PCT/EP2011/072170 filed on Dec. 8, 2011 in the name of Saint-Gobain Glass France (English + German Version).
PCT International Search Report mailed on Feb. 27, 2012 for PCT Application PCT/EP2011/072492 filed on Dec. 12, 2011 in the name of Saint-Gobain Glass France.
PCT International Search Report mailed on Feb. 27, 2012 for PCT Application PCT/EP2011/072169 filed on Dec. 8, 2011 in the name of Saint-Gobain Glass France.
PCT International Search Report mailed on Mar. 6, 2012 for PCT Application PCT/EP2011/072170 filed on Dec. 8, 2011 in the name of Saint-Gobain Glass France.
Notice of Allowance for U.S. Appl. No. 13/990,409, filed Aug. 7, 2013 on behalf of Michael Balduin. Mail Date: Jun. 14, 2016. 10 pages.
Final Office Action for U.S. Appl. No. 14/015,850 filed Aug. 30, 2013 on behalf of Michael Balduin. Mail Date: Mar. 25, 2016. 16 pages.

* cited by examiner

BENT WINDOWPANE

CROSS REFERENCE TO RELATED APPLICATIONS

The present application is the US national stage of International Patent Application PCT/EP2011/072492 filed on Dec. 12, 2011 which, in turn, claims priority to European Patent Application EP 10194800.8 filed on Dec. 13, 2010.

The invention relates to a bent pane and a method for production thereof.

Besides aspects of the equipment, the development of new motor vehicles is also determined to a large extent by design elements. In this, the significance of windshield design is increasing because of the large, highly visible area. In this regard, not only the appearance of the windshield, but also aspects for energy conservation and environmental impact play a role. Powerful microprocessors as well as CAD (Computer-Aided Design) supported software packages also enable greater adaptation and optimization of the aerodynamic resistance of the windshield. For this reason, modern windshields in motor vehicles have increasingly complex shapes. In particular, motor vehicles with very low fuel consumption but also sports cars make high demands on pane geometry and thus also on the glass pane bending methods necessary for their implementation. The bending of a glass pane can be realized, for example, through a combination of gravity bending and press bending. One or a plurality of glass panes are placed in a bending ring and heated. In this process, the glass pane is bent along the geometry predefined by the bending ring with the help of gravity acting on the heated glass pane. Then, the heated glass is bent into the corresponding shape with the help of negative pressure and a suitable frame.

More complex geometries cannot usually be realized with a single bending process. This is rendered more difficult by the fact that separate or subsequent bending processes cannot be combined arbitrarily. These factors clearly limit the possibilities of obtaining the pane geometries sought. In particular, the combination of edge bending and surface bending to produce complex geometries can be realized only with difficulty.

EP 0 677 491 A2 discloses a method for bending and tempering glass panes. The glass panes are heated to their softening temperature, pressed between two complementary shapes in a device, and then transferred into a transport ring. The panes are then tempered and cooled in the transport ring.

EP 1 371 616 B1 discloses a device for bending and tempering glass panes. The device comprises, among other things, successive mold carriers, preheating sections for heating glass panes to bending temperature, a gravity-based pre-bending section, a bending section with a press mold, and a cooling section.

EP 1 358 131 B1 discloses a method for bending of glass panes in pairs. For this, the pair of glass panes is pre-bent in a horizontal position on a bending mold in the form of a frame by gravitational bending. Then, the pair of glass panes is further bent with an entire surface bending mold.

US 2008/0134722 A1 discloses a method and a device for bending superposed panes. The panes are lifted by a suction mold and pressed by an opposing mold and bent according to the geometry.

The object of the present invention is to provide a pane that has complex final bends of the surface and of the edges and can be realized in a single production process.

The object of the invention is accomplished by a device according to claim 1. Advantageous embodiments emerge from the dependent claims.

A method for producing the pane according to the invention and use thereof are presented in other independent claims.

The motor vehicle glazing according to the invention comprises at least one pane with a pane height of 900 mm to 1650 mm viewed from the vehicle floor. The pane can be implemented both as single-ply glazing and laminated glazing. The pane has edges in the region of a roof top edge, an A-pillar edge, and a vehicle body edge. The pane comprises two imaginary (virtual) rectangular surfaces A and B. The surface A has dimensions of 800 mm*800 mm and the surface B has dimensions of 1000 mm*700 mm. The overlapping virtual surfaces A and B are centrally delimited by the lowest contact point of the pane with the vehicle body edge horizontal to the floor. The term "horizontal to the floor, centrally" refers to the situation of the pane installed in the vehicle.

At the same time, the lowest contact point and the point of the roof top edge situated the shortest distance from the contact point form an imaginary (virtual) Y0 axis. The two points farthest apart based on the width of the pane form an imaginary (virtual) Z0 axis. The complexity of the pane according to the invention is described by the radii of curvature of the pane inside the surfaces A and B. The pane has, relative to the installation situation in a motor vehicle body, vertical radii of curvature of 18 m to 2 m and horizontal radii of curvature of 10 m to 1.0 m in the region of the surface A. The pane also has, relative to the installation situation in a motor vehicle body, vertical radii of curvature in the range of 18 m to 3 m and horizontal radii of curvature of 10 m to 0.8 m in the region of the surface B. At the same time, the curvature of the pane along the virtual Y0-axis on the boundary with the roof top edge corresponds to a first tangent. This first tangent forms an angle α (alpha) of −10° to +15° with the (vehicle body) roof surface. Parallel thereto, the curvature of the pane touching Z0 on the boundary of the pane with A-pillar edge corresponds to a second tangent. This second tangent forms an angle β (beta) of 28° to 70° with the imaginary (virtual) Z0-axis. The A-pillar edge means the edge of the pane that faces the A-pillar. The roof top edge means the edge of the pane that faces the roof.

The pane preferably has vertical radii of curvature of 10 m to 3 m and horizontal radii of curvature of 8 m to 2.0 m in the region of the surface A, as well as vertical radii of curvature in the range of 10 m to 4 m and horizontal radii of curvature of 8 m to 1.0 m in the region of the surface B.

The angle α (alpha) of the first tangent to the roof surface is preferably from −5° to 10° and/or the angle β (beta) of the to the imaginary (virtual) Z0-axis is preferably from 40° to 65°.

The pane height is preferably 1000 mm to 1250 mm.

In an alternative embodiment, the motor vehicle glazing according to the invention comprises at least one pane with a pane height of 1100 mm to 1850 mm viewed from the vehicle floor. The pane can be implemented both as single-ply glazing and laminated glazing. The pane has edges in the region of a roof top edge, an A-pillar edge, and a vehicle body edge. The pane comprises two imaginary (virtual) rectangular surfaces A and B. The surface A has dimensions of 800 mm*800 mm and the surface B has dimensions of 1000 mm*700 mm. The overlapping virtual surfaces A and B are centrally delimited by the lowest contact point of the pane with the vehicle body edge horizontal to the floor. The term "horizontal to the floor, centrally" refers to the situation of the pane installed in the vehicle. At the same time, the lowest contact point and the point of the roof top edge situated the shortest distance from the contact point form an imaginary (virtual) Y0 axis. The two points farthest apart based on the width of the pane form an imaginary (virtual) Z0 axis. The complexity of the pane according to the invention is described by the radii of curvature of the pane inside the surfaces A and B. The pane has, relative to the installation situation in a motor vehicle body, vertical radii of curvature of 18 m to 3 m and horizontal radii of curvature of 10 m to 3 m in the region of the surface A. The pane also has, relative to the installation situation in a motor vehicle body, vertical radii of curvature in the range of 18 m to 4 m and horizontal radii of curvature of 10 m to 2 m in the region of the surface B. At the same time, the curvature of the pane along the virtual Y0-axis on the boundary with the roof top edge corresponds to a first tangent. This first tangent forms an angle α (alpha) of −20° to +15° with the (vehicle body) roof surface. Parallel thereto, the curvature of the pane touching Z0 on the A-pillar edge corresponds to a second tangent. This second tangent forms an angle β (beta) of 3° to 30° with the imaginary (virtual) Z0-axis. The A-pillar edge means the edge of the pane that faces the A-pillar. The roof top edge means the edge of the pane that faces the roof.

The pane preferably has vertical radii of curvature of 15 m to 4 m and horizontal radii of curvature of 8 m to 4.0 m in the region of the surface A, as well as vertical radii of curvature in the range of 15 m to 5 m and horizontal radii of curvature of 8 m to 3 m in the region of the surface B.

The angle α (alpha) of the first tangent to the roof surface is preferably from −10° to 5° and/or the angle β (beta) of the second tangent to the imaginary (virtual) Z0-axis is preferably from 5° to 20°.

The pane height is preferably 1250 mm to 1650 mm.

In another alternative embodiment, the motor vehicle glazing according to the invention comprises at least one pane with a pane height of 1100 mm to 1850 mm viewed from the vehicle floor. The pane can be implemented both as single-ply glazing and laminated glazing. The pane has edges in the region of a roof top edge, an A-pillar edge, and a vehicle body edge. The pane comprises two imaginary (virtual) rectangular surfaces A and B. The surface A has dimensions of 800 mm*800 mm and the surface B has dimensions of 1000 mm*700 mm. The overlapping virtual surfaces A and B are centrally delimited by the lowest contact point of the pane with the vehicle body edge horizontal to the floor. The term "horizontal to the floor, centrally" refers to the situation of the pane installed in the vehicle. At the same time, the lowest contact point and the point of the roof top edge situated the shortest distance from the contact point form an imaginary (virtual) Y0 axis. The two points farthest apart based on the width of the pane form an imaginary (virtual) Z0 axis. The complexity of the pane according to the invention is described by the radii of curvature of the pane inside the surfaces A and B. The pane has, relative to the installation situation in a motor vehicle body, vertical radii of curvature of 18 m to 3 m and horizontal radii of curvature of 10 m to 3 m in the region of the surface A. The pane also has, relative to the installation situation in a motor vehicle body, vertical radii of curvature in the range of 18 m to 4 m and horizontal radii of curvature of 10 m to 2 m in the region of the surface B. At the same time, the curvature of the pane along the virtual Y0-axis on the boundary with the roof top edge corresponds to a first tangent. This first tangent forms an angle α (alpha) of −20° to +15° with the (vehicle body) roof surface. Parallel thereto, the curvature of the pane touching Z0 on the A-pillar edge corresponds to a second tangent. This second tangent forms an angle β (beta) of 3° to 30° with the imaginary (virtual) Z0-axis. The A-pillar edge means the edge of the pane that faces the A-pillar. The roof top edge means the edge of the pane that faces the roof.

The pane preferably has vertical radii of curvature of 15 m to 4 m and horizontal radii of curvature of 8 m to 4.0 m in the region of the surface A, as well as vertical radii of curvature in the range of 15 m to 5 m and horizontal radii of curvature of 8 m to 3 m in the region of the surface B.

The angle α (alpha) of the first tangent to the roof surface is preferably from −10° to 5° and/or the angle β (beta) of the second tangent to the imaginary (virtual) Z0-axis is preferably from 5° to 20°.

The pane height is preferably 1250 mm to 1650 mm.

The method for bending panes according to the invention enables the combination of edge bending as well as surface bending. In this manner, the realization of the geometries and radii of curvature of the pane according to the invention and of the two alternative embodiments of the pane according to the invention is possible. The final geometry depends on the geometry of the motor vehicle geometry (vehicle body) and can be calculated and simulated conventionally by the person skilled in the art using CAD programs. The method comprises a first step, wherein at least one pane, preferably a first pane and a second pane, are placed in a pre-bending ring on a movable bending ring holder. The method is suitable for both one pane and for the bending of panes in pairs. The pre-bending ring preferably has a mean final bend of the edge of 5% to 50%. The movable bending ring holder then moves into a furnace, and the panes are heated in the pre-bending ring by a heating device at least to the softening temperature of the glass, preferably 550° C. to 800 ° C. The softening temperature is determined by the composition of the glass. The panes placed in the pre-bending ring are pre-bent through the action of gravity to 5% to 50% of the local final bend of the edge. In the context of the invention, the term "final bend of the edge" is the mean (final) bend in the final, finished state of at least a part of the edge of the pane or bending ring edge with a dimension or length of at least 30% of the total bending ring edge or pane edge. The panes are lifted in the next step by a suction device and bent further beyond the bending obtained in the pre-bending ring. The panes are preferably bent to 102% to 130% of the final bend of the edge. The bending takes place over a counter framework situated in the suction device. The counter framework preferably has the shape of a ring with a protruding, bent contact surface. The suction device includes, in addition to the counter framework, a cover with an air baffle surrounding the counter framework. The air baffle is situated adjacent the lifted pane and is designed such that, during the bending on the contact surface of the counter framework, the pane is at a distance of 3 mm to 50 mm from the air baffle. This distance enables continuous suction of air in the intermediate space between the pane and the air baffle. The air sucked in generates a negative pressure for fixing the pane on the contact surface. The suction process bends the panes corresponding to the bend (curvature) of the contact surface. The contact region of the molded part, in particular the contact surface with the pane, is preferably lined with a flexible or soft material. This material preferably includes fire resistant fibers of glass, metal, or ceramic, and prevents damage such as scratches on the panes. A description of the mode of operation and structure of the suction device for lifting the pane is found in US 2008/0134722 A1, [0036] and [0038] through [0040] as well as Claim 1 a). The panes are then placed by the suction device in a final bending ring on the movable bending ring holder. The final bending ring preferably has at least a 30% larger mean final bend of the edge than the pre-bending ring. The placement of the panes can take place, for example, by raising the suction pressure by means of a pressure drop in the suction device. The pre-bending ring and the final bending ring are, in each case, bent corresponding to the intended pane geometry. The circumference and the opening angle of the bending ring are adapted to the geometry of the pane to be bent. The pre-bending ring and the final bending ring are preferably disposed on the same movable bending ring holder and can, for example, be converted by removal of a pin or a bracket from the pre-bending ring into the final bending ring. In the context of the invention, the term "convert" means both the changing of the shape (geometry) of the bending ring from the pre-bending ring to the final bending ring and a taking off of the pre-bending ring as well as "making accessible" a final bending ring disposed beneath the pre-bending ring. The pane placed on the final bending ring is pre-bent by thermal irradiation in the surface. For this, a temperature gradient is set above the pane and different surface bending is enabled by the different heating. The heating device preferably includes an arrangement of individual separately controllable heating tiles. As a result of the different thermal radiation of the tiles, different temperature regions can be realized on the panes. Then, the panes are lifted by a second suction device. The second suction device preferably has the same structure as the first suction device. In the next step, the panes are pressed against a counter mold and preferably bent in the surface of the pane. The structure of this counter mold is described in US2008/0134722 A1 in [0037] and FIG. 2. The counter mode functions as a negative of the surface bend of the pane and bends the pane into the final surface geometry. Then, the panes are placed on the final bending ring and cooled.

The panes preferably include glass, particularly preferably flat glass (float glass), quartz glass, borosilicate glass, and/or soda lime glass.

The panes are preferably lifted by the suction device and bent to 100% to 130%, preferably to 105% to 120% of the mean overall final bend of the edge. The term "overall final bend of the edge" refers to a uniform bending of the entire pane expressed as a percentage. The panes are preferably shaped on a bending ring (counter framework) in the suction device such that they have a bend of the edge that exceeds, in shape or extent, the amount of the final bend of the edge.

The pane is preferably bent by the suction device with a locally different final bend of the edge. The term "local final bend of the edge" refers to a nonuniform (final) bend (of the edge) of the entire pane expressed as a percentage.

The pane is preferably bent locally in the first and/or second suction device by a stream of air or a lower bending ring. The term "locally" means individual regions of the pane, in which an additional bend is set in a limited region by a stream of air, preferably from a nozzle. Alternatively, the local bending described can occur by means of a bending ring applied from below.

The panes are preferably heated by a temperature gradient on the glass surface with a maximum of 0.05 K/mm to 0.5 K/mm, preferably 0.1 K/mm to 0.2 K/mm. The adjustment of the temperature gradient takes place preferably via heating devices differently controlled (i.e., different amounts of radiated heat) and placed above or below the panes.

The panes are preferably heated to a temperature of 500° C. to 750° C., particularly preferably 580° C. to 650° C.

The panes are preferably pre-bent by gravity in the pre-bending ring to 10% to 30% of the mean final bend.

The suction device preferably builds a suction pressure of 1 kg/m$^2$ to 100 kg/m$^2$. This suction pressure is sufficient to securely fix the panes on the suction device and to bend them over the counter framework.

The invention further includes a pane, in particular a pair of panes, bent with the method according to the invention.

The invention further includes the use of the pane according to the invention as a motor vehicle windshield.

The functional regions of the surfaces A and B serve in all embodiments of the invention in the area of transmission optics, wipeability by windshield wipers, and suitability as a surface for head-up-displays (HUD). In the surfaces A and B, the radii of curvature according to the invention permit optimal properties of the characteristics mentioned.

The transitions according to the invention in all embodiments of the invention permit a reduction of wind resistance through edge minimization. The transitions according to the invention in the region of the A-pillar reduce noise generation.

In the following, the invention is explained in detail with reference to drawings and an exemplary embodiment as well as a comparative example. The drawings are purely schematic depictions and not to scale. They in no way limit the invention.

Figure 2:
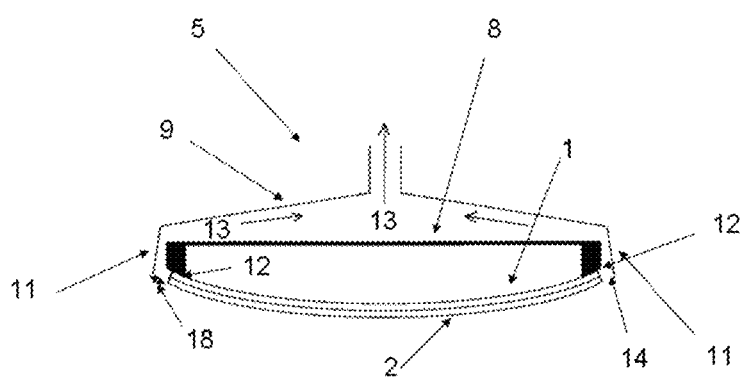
Figure 3:
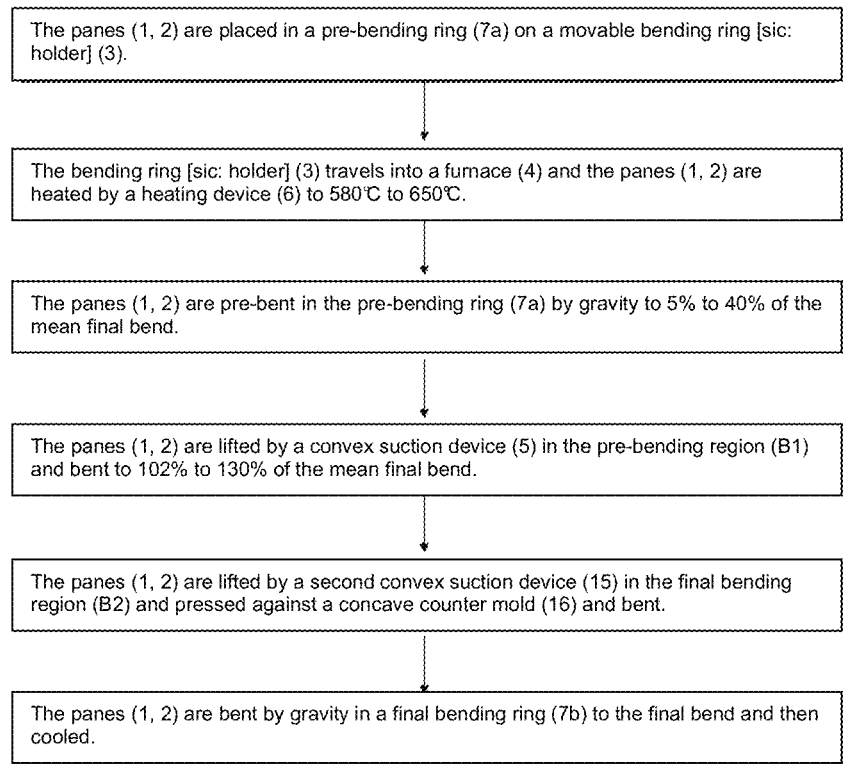
Figure 4:
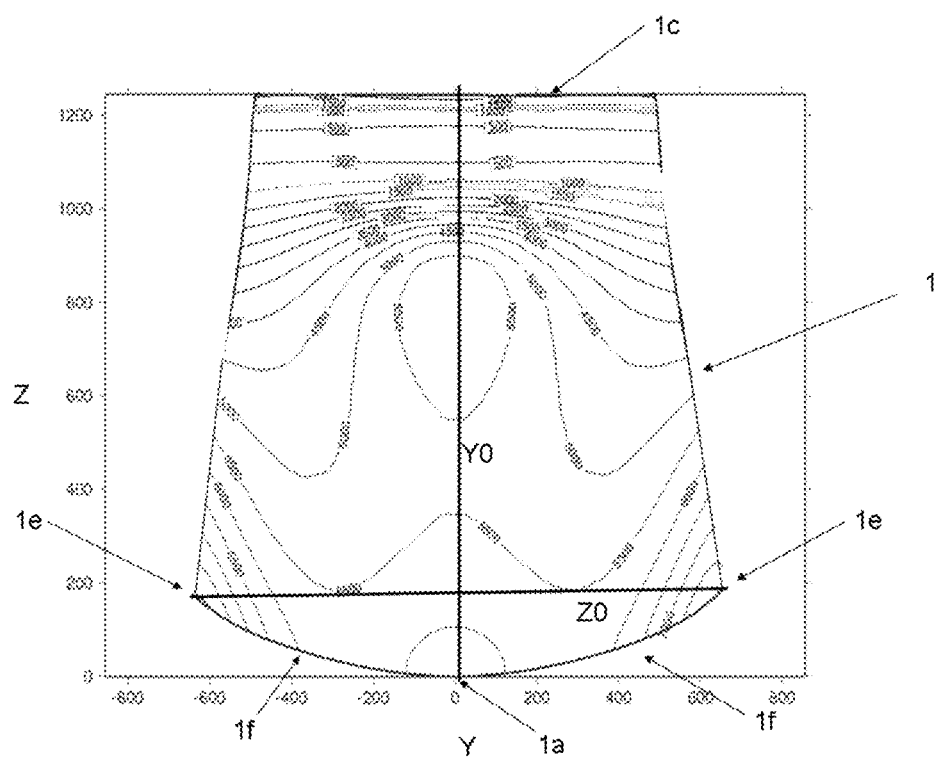
Figure 5:
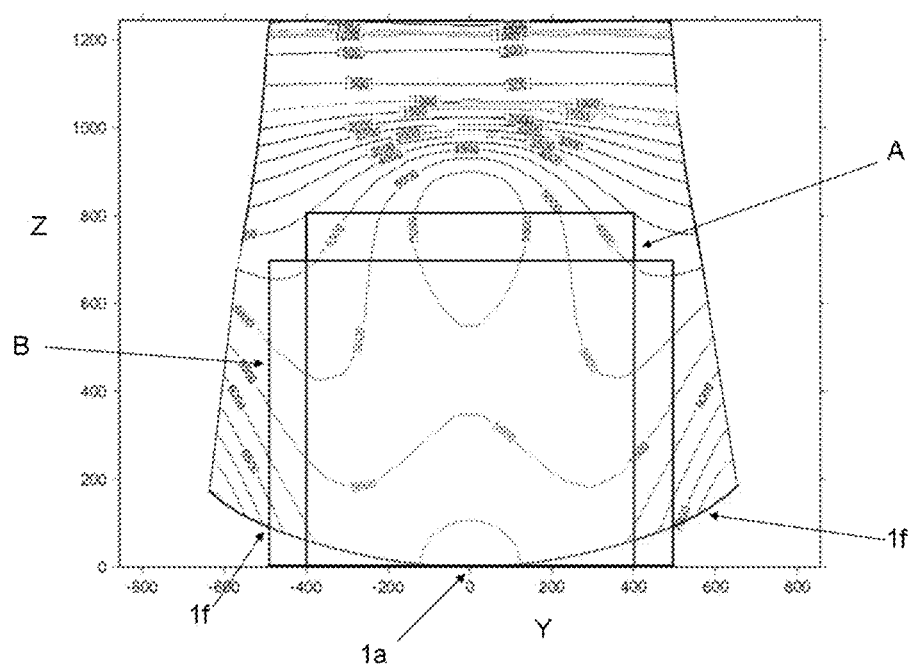
Figure 6:
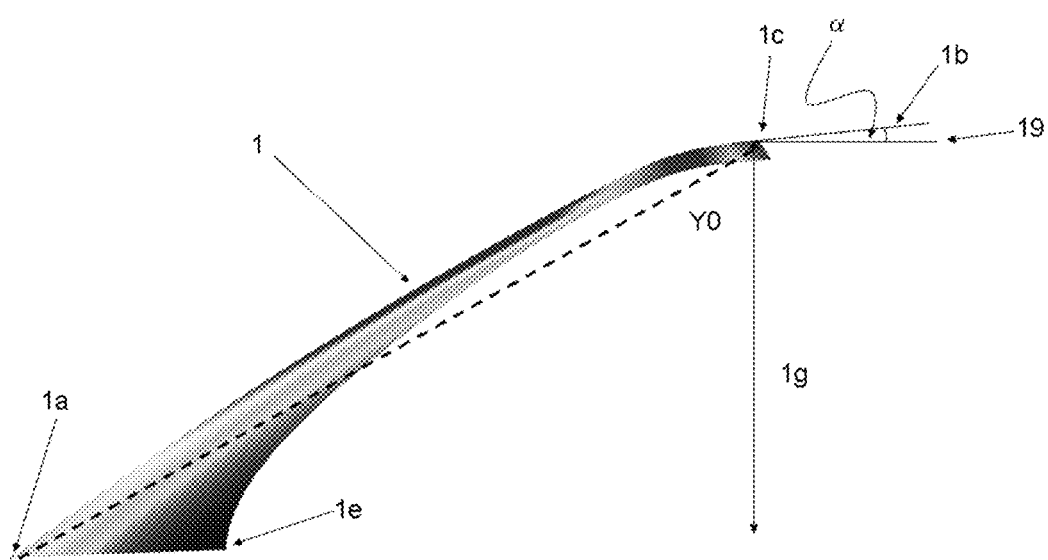
Figure 7:
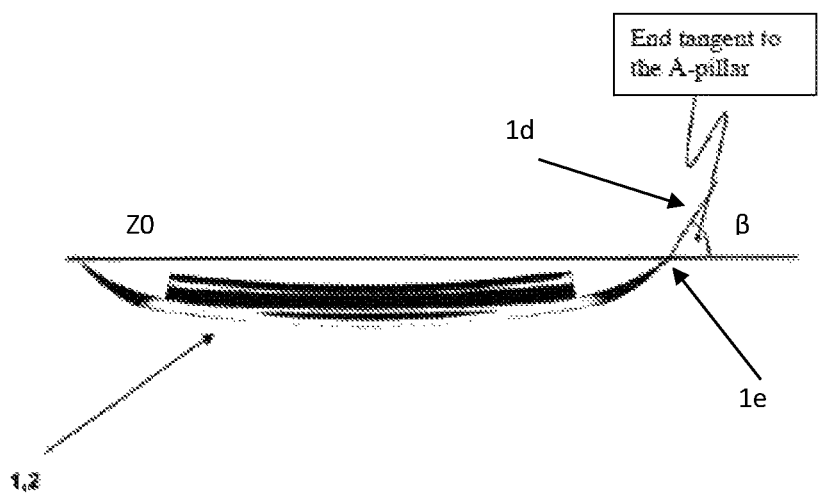

They depict:

FIG. 1 a cross-section of a furnace according to the invention,

FIG. 2 a cross-section of the suction device,

FIG. 3 a flowchart of the method according to the invention,

FIG. 4 a schematic structure of a pane according to the invention,

FIG. 5 a schematic structure of the pane according to the invention with A and B fields drawn in, FIG. 6 the transition of a pane according to the invention into the roof region, and FIG. 7 a top view of the pane according to the invention.

FIG. 1 depicts a cross-section of the furnace according to the invention for producing a pane according to the invention. The furnace comprises heating devices (6) and bending ring holders (3) movable inside and outside the furnace by a transport device (10) having, in each case, a pre-bending ring (7a). Inside a preheating region (A), the panes (1, 2) are heated to the softening temperature of the respective glass. In the pre-bending region (B), a first, vertically displaceable, preferably convexly bent suction device (5) connects to the preheating region (A). The suction device (5) enables picking up the panes (1, 2) out of the bending ring holder (3), pre-bending the panes (1, 2), and placing the pre-bent panes (1, 2) on a final bending ring (7b). The pre-bending ring (7a) and the final bending ring (7b) can be converted, for example, by the removal of a pin or a bracket from the pre-bending ring (7a) into the final bending ring (7b). An intermediate region (C) for heating the panes (1, 2) placed on the final bending ring (7b) connects to the suction device (5) in the pre-bending region (B). The final bending region (D) with a second vertically displaceable, convexly bent suction device (15) is situated adjacent the intermediate region (C). The second vertically displaceable, convexly bent suction device (15) is horizontally movable and enables lifting and bending of the panes (1, 2). The second vertically displaceable, convexly bent suction device (15) corresponds in its basic structure to the suction device (5). The basic structure of the suction device (5, 15) is also described in US2008/0134722 A1. The corresponding final bend can be produced in the panes (1, 2) picked up by the convexly bent suction device (15) by a horizontally and vertically displaceable concavely bent counter mold (16). The panes (1, 2) are pressed between the convexly bent suction device (15) and the concavely bent counter mold (16). To increase the cycle speed, yet another third suction device (17) can be installed in addition to the convexly bent suction device (15). The third suction device (17) can pick up panes while panes are being bent in the second suction device. After conclusion of the pressing or bending process, the panes (1, 2) can be placed back on the final bending ring (7b) by the convexly bent suction device (9). A cooling region (E) forms the final portion of the furnace according to the invention. The preheating region (A), the pre-bending region (B), the intermediate region (C), the final bending region (D), and the cooling region (E]) are disposed connected in succession.

FIG. 2 depicts a cross-section of the suction device (5). The suction device (5) includes a counter framework (8) and a cover (9) surrounding the counter framework (8). The counter framework (8) can be bent over as a whole or locally relative to the final bending ring (7b) (not shown). The counter framework acts as a "negative mold" relative to the final bending ring (7b) (not shown). A stream of air (13) is drawn into the suction device (5) over the edge zone (14) between the counter framework (8) and the cover (9). With the help of the resultant negative pressure, the panes (1, 2) are suctioned, lifted, and bent. The contact surface (12) of the counter framework (8) with the second pane (2) is preferably lined with a flexible or soft material, such as fire resistant fibers of glass, metal, or ceramic.

FIG. 3 depicts a flowchart of the method according to the invention. Two panes (1, 2) are placed in a pre-bending bending ring (7a) on a movable bending ring (3). The bending ring (3) is then transported into a furnace. The panes (1, 2) are heated by a heating device (6) consisting of radiation heating elements to the softening temperature of the panes (1, 2), roughly 580° C. to 650° C. During the course of the heating of the panes (1, 2), the panes (1, 2) situated in the pre-bending ring (7a) are pre-bent with the help of gravity to 5% to 40% of the mean final bend to be obtained. The heating device preferably comprises an arrangement of individual separately controllable heating tiles. As a result of the different thermal radiation of the tiles, different temperature regions can be realized on the panes (1, 2). The different temperature regions enable a gradual heating of the surface of the panes. The panes (1, 2) are then lifted by a preferably convex suction device (5) and bent to 102% to 130% of the mean final bend. In a next step, the panes (1, 2) are placed by the convex suction device (5) on the final bending ring (7b) on the movable bending ring holder (3). The pre-bending ring (7a) and the final bending ring (7b) are in each case bent corresponding to the intended pane geometry. The pre-bending ring (7a) and the final bending ring (7b) are preferably disposed on the same movable bending ring holder] (3) and can be converted, by the removal of a pin from the pre-bending ring (7a), into the final bending ring (7b). The panes are heated in the intermediate region (C). The panes (1, 2) placed on the final bending ring (7b) are pre-bent in the surface by heat irradiation. For this, a temperature gradient is set above the panes (1, 2) in the intermediate region (C) and different surface bending is enabled by the different heating. The heating device (6) preferably includes an arrangement of individual separately controllable heating tiles. As a result of the different thermal radiation of the tiles, different temperature regions can be realized on the panes (1, 2). Then, the panes are lifted in the final bending region (D) by a second suction device (15) and pressed against a preferably concave counter mold (16) and shaped. The counter mold has "inverse" geometry compared to the second suction device (15). Then, the panes (1, 2) are placed on the final bending ring (7b) and cooled.

FIG. 4 depicts a pane (1, 2) according to the invention in a virtual Y, Z grid. The numbers reported on the axes indicate the length data or dimensions of the pane according to the invention in mm. The imaginary (virtual) Y0 axis runs along the vehicle body edge (1f) from the lowest contact point (1a) of the pane (1) at the shortest distance from the roof top edge (1c). The Z0 axis runs between the farthest apart points along the width of the pane (Y axis). The lines drawn on the pane (1) indicate, by way of example, the corresponding radii of curvature.

FIG. 5 depicts a pane according to the invention in a virtual Y, Z grid. The edges of the surface A and the surface B oriented toward the vehicle body edge (1f) lie one over the other, centrally in the lowest contact point (1a) and parallel to the floor. The term "floor" refers to the floor surface parallel to the motor vehicle glazing according to the invention installed in the motor vehicle. Within the virtual surfaces A and B, there are high requirements relative to transmission in the primary field of vision. Even the use of the pane in the area of head-up-display is possible in the regions of the surface A and surface B mentioned.

FIG. 6 depicts a side view of the transition of a pane (1) according to the invention in the roof region of a motor vehicle. In the region of the roof top edge (1c) of the pane (1), the first tangent (1b) is depicted as a continuation of the curvature of the pane. Together with the implied roof surface (19), the first tangent (1b) encloses the angle α (alpha). The Y0 axis drawn as a broken line runs in the shortest distance from the roof top edge (1c) to the lowest contact point (1a). On the side, the pane transitions on the side edges (1e) into the A-pillar of the vehicle body. The height (1g) of the pane (1) is determined in the installed form.

FIG. 7 depicts in a top view the pane (1) according to the invention along the Z0 axis. The extension of the Z0 axis forms, together with the second tangent (1d) on the side edge (1e) of the pane, the angle β (beta). The second tangent forms the lateral extension of the curvature of the pane of the pane (1) according to the invention.

LIST OF REFERENCE CHARACTERS (1) first pane
(1a) lowest contact point
(1b) first tangent
(1c) roof top edge/the edge of the pane (1) facing the roof
(1d) second tangent
(1e) side edge
(1f) vehicle body edge/the edge of the pane (1) facing the vehicle body
(1g) pane height
(2) second pane
(3) movable bending ring holder
(4) furnace
(5) suction device
(6) heating device
(7a) pre-bending ring
(7b) final bending ring
(8) counter framework
(9) cover
(10) transport device
(11) air baffle

(12) contact surface
(13) stream of air
(14) edge zone
(15) second suction device
(16) counter mold
(17) third suction device
(18) distance between the pane and the air baffle
(19) roof surface
(A) preheating region
(B) pre-bending region
(D) second bending region
(C) heating region
(E) cooling region
(α) angle between the tangent laid out on the pane end (toward the roof) and the horizontal of a virtual motor vehicle roof
(β) angle between the Z0 axis and the tangent laid out

The invention claimed is:

1. A motor vehicle glazing comprising:
at least one pane with a pane height of 900 mm to 1650 mm, the at least one pane comprising a roof top edge, a side edge of a pillar, a vehicle body edge, and a first and second rectangular surface, wherein the first rectangular surface has dimensions of 800 mm*800 mm, the second rectangular surface has dimensions of 1000 mm*700 mm and the first and second rectangular surfaces are centrally delimited by a lowest contact point of the at least one pane with the vehicle body edge horizontal to a floor, and the lowest contact point and a point of the roof top edge situated at a shortest distance from the lowest contact point form a first axis and two points farthest apart based on a width of the at least one pane form a second axis,
wherein the at least one pane:
has vertical radii of curvature of 10 m to 3 m and horizontal radii of curvature of 8 m to 2 m in a region of the first rectangular surface,
has vertical radii of curvature in a range from 10 m to 4 m and horizontal radii of curvature of 8 m to 1 m in a region of the second rectangular surface,
has a curvature of the at least one pane along the first axis on a boundary with the roof top edge corresponding to a first tangent, wherein the first tangent forms an angle α of −10° to 15° with a roof surface, and
has the curvature of the at least one pane touching the second axis at the side edge of the pillar corresponding to a second tangent, wherein the second tangent forms an angle β of 28° to 70° with the second axis.

2. The motor vehicle glazing according to claim 1, wherein the angle α is from −5° to 10°.

3. The motor vehicle glazing according to claim 1, wherein the angle β is from 40° to 65°.

4. The motor vehicle glazing according to claim 1, wherein the pane height is from 1000 mm to 1250 mm.

5. A motor vehicle glazing comprising:
at least one pane with a pane height of 1100 mm to 1850 mm, the at least one pane comprising a roof top edge, a side edge of a pillar, a vehicle body edge, and a first and second rectangular surface, wherein the first rectangular surface has dimensions of 800 mm*800 mm, the second rectangular surface has dimensions of 1000 mm*700 mm, and the first and second rectangular surfaces are centrally delimited by a lowest contact point of the at least one pane with the vehicle body edge horizontal to a floor, and the lowest contact point and a point of the roof top edge situated at a shortest distance from the lowest contact point form a first axis, and two points farthest apart based on a width of the at least one pane form a second axis,
wherein the at least one pane:
has vertical radii of curvature of 18 m to 3 m and horizontal radii of curvature of 10 m to 3 m in a region of the first rectangular surface,
has vertical radii of curvature in a range from 18 m to 4 m and horizontal radii of curvature of 10 m to 2 m in a region of the second rectangular surface,
has a curvature of the at least one pane along the first axis on a boundary with the roof top edge corresponding to a first tangent, wherein the first tangent forms an angle α of −20° to 15° with a roof surface, and
has a curvature of the at least one pane touching the second axis at the side edge of the pillar corresponding to a second tangent, wherein the second tangent forms an angle β of 3° to 30° with the second axis.

6. The motor vehicle glazing according to claim 5, wherein the at least one pane has vertical radii of curvature of 15 m to 4 m and horizontal radii of curvature of 8 m to 4 m in the region of the first rectangular surface, and vertical radii of curvature in the range 15 m to 5 m and horizontal radii of curvature of 8 m to 3 m in the region of the second rectangular surface.

7. The motor vehicle glazing according to claim 5, wherein the angle α is from −10° to 5°.

8. The motor vehicle glazing according to claim 5, wherein the angle β is from 5° to 20°.

9. The motor vehicle glazing according to claim 5, wherein the pane height is from 1250 mm to 1650 mm.

10. A motor vehicle glazing comprising:
at least one pane with a pane height of 700 mm to 1100 mm,
a roof top edge,
a side edge of a pillar,
a vehicle body edge, and
a first and second rectangular surface, wherein the first rectangular surface has dimensions of 800 mm*800 mm, the second rectangular surface has dimensions of 1000 mm*700 mm, and the first and rectangular surfaces are centrally delimited by a lowest contact point of the at least one pane with the vehicle body edge horizontal to a floor, and the lowest contact point and a point of the roof top edge situated at a shortest distance from the lowest contact point form a first axis, and two points farthest apart based on a width of the at least one pane form a second axis, wherein the at least one pane:
has vertical radii of curvature of 18 m to 4 m and horizontal radii of curvature of 6 m to 1 m in a region of the first rectangular surface,
has vertical radii of curvature in a range from 18 m to 5 m and horizontal radii of curvature of 6 m to 0.8 m in a region of the second rectangular surface,
has a curvature of the at least one pane along the first axis on a boundary with the roof top edge corresponding to a first tangent, wherein the first tangent forms an angle α of 15° to 50° with a roof surface, and
has a curvature of the at least one pane touching the second axis at the side edge of the pillar corresponding to a second tangent, wherein the second tangent forms an angle β of 28° to 90° with the second axis.

11. The motor vehicle glazing according to claim 10, wherein the at least one pane has vertical radii of curvature of 18 m to 5 m and horizontal radii of curvature of 6 m to 2 m in the region of the first rectangular surface, and vertical radii of curvature in the range 18 m to 6 m and horizontal radii of curvature of 6 m to 1.5 m in the region of the second rectangular surface.

12. The motor vehicle glazing according to claim 10, wherein the angle α is from 25° to 45°.

13. The motor vehicle glazing according to claim 10, wherein the angle β is from 45° to 70°.

14. The motor vehicle glazing according to claim 10, wherein the pane height is from 800 mm to 1000 mm.

15. A method for bending a pane, comprising placing at least one pane in a pre-bending ring with a movable bending ring holder, the movable bending ring holder being moved into a furnace, and the at least one pane being heated to a softening temperature and pre-bent to 5% to 50% of a final bend of an edge, lifting the at least one pane by a suction device and further bending the at least one pane beyond the bending obtained in the pre-bending ring, wherein during the bending on a bent contact surface of a counter framework of the suction device, a minimum distance of 3 mm to 50 mm between the at least one pane and an air baffle of a cover of the suction device that surrounds the counter framework is present, placing the at least one pane by means of the suction device in a final bending ring on the movable bending ring holder and bending the at least one pane to a final bend of the edge, wherein surface pre-bending of the at least one pane takes place by thermal irradiation, lifting the at least one pane by a second suction device out of the final bending ring, pressed against a counter mold and bent, and placing the at least one pane on the final bending ring, and cooling the at least one pane, wherein the at least one pane having a pane height of 900 mm to 1650 mm comprises a roof top edge, a side edge of a pillar, a vehicle body edge, and a first and second rectangular surface, wherein the first rectangular surface has dimensions of 800 mm*800 mm, the second rectangular surface has dimensions of 1000 mm*700 mm and the first and second rectangular surfaces are centrally delimited by a lowest contact point of the at least one pane with the vehicle body edge horizontal to a floor, and the lowest contact point and a point of the roof top edge situated at a shortest distance from the lowest contact point form a first axis and two points farthest apart based on a width of the at least one pane form a second axis, wherein the at least one pane has vertical radii of curvature of 10 m to 3 m and horizontal radii of curvature of 8 m to 2 m in a region of the first rectangular surface, has vertical radii of curvature in a range from 10 m to 4 m and horizontal radii of curvature of 8 m to 1 m in a region of the second rectangular surface, has a curvature of the at least one pane along the first axis on a boundary with the roof top edge corresponding to a first tangent, wherein the first tangent forms an angle α of −10° to 15° with a roof surface, and has the curvature of the at least one pane touching the second axis at the side edge of the pillar corresponding to a second tangent, wherein the second tangent forms an angle β of 28° to 70° with the second axis.

16. A method comprising:

using at least one pane as a motor vehicle windshield, preferably as a motor vehicle windshield with a head-up-display, wherein the at least one pane having a pane height of 900 mm to 1650 mm comprises a roof top edge, a side edge of a pillar, a vehicle body edge, and a first and second rectangular surface, wherein the first rectangular surface has dimensions of 800 mm*800 mm, the second rectangular surface has dimensions of 1000 mm*700 mm and the first and second rectangular surfaces are centrally delimited by a lowest contact point of the at least one pane with the vehicle body edge horizontal to a floor, and the lowest contact point and a point of the roof top edge situated at a shortest distance from the lowest contact point form a first axis and two points farthest apart based on a width of the at least one pane form a second axis, wherein the at least one pane has vertical radii of curvature of 10 m to 3 m and horizontal radii of curvature of 8 m to 2 m in a region of the first rectangular surface, has vertical radii of curvature in a range from 10 m to 4 m and horizontal radii of curvature of 8 m to 1 m in a region of the second rectangular surface, has a curvature of the at least one pane along the first axis on a boundary with the roof top edge corresponding to a first tangent, wherein the first tangent forms an angle α of −10° to 15° with a roof surface, and has the curvature of the at least one pane touching the second axis at the side edge of the pillar corresponding to a second tangent, wherein the second tangent forms an angle β of 28° to 70° with the second axis.

* * * * *